(12) United States Patent
Sakakibara

(10) Patent No.: US 7,185,937 B2
(45) Date of Patent: Mar. 6, 2007

(54) INSTALLATION STRUCTURE FOR CONSOLE MODULE

(75) Inventor: Yasuhiro Sakakibara, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 90 days.

(21) Appl. No.: 10/974,965

(22) Filed: Oct. 28, 2004

(65) Prior Publication Data
US 2005/0116488 A1 Jun. 2, 2005

(30) Foreign Application Priority Data
Oct. 31, 2003 (JP) ............ 2003-373195
May 28, 2004 (JP) ............ 2004-160011

(51) Int. Cl.
*B60R 7/06* (2006.01)
(52) U.S. Cl. ............... 296/37.8
(58) Field of Classification Search ........ 296/37.8, 296/37.1, 24.3
See application file for complete search history.

(56) References Cited

U.S. PATENT DOCUMENTS

| | | | |
|---|---|---|---|
| 3,520,555 A * | 7/1970 | Blair | 410/100 |
| 3,550,001 A * | 12/1970 | Hanley | 455/575.9 |
| 5,418,836 A * | 5/1995 | Yazaki | 455/569.2 |
| 5,555,491 A * | 9/1996 | Tao | 361/686 |
| 6,264,273 B1 * | 7/2001 | Waters, Sr. | 297/188.14 |
| 6,428,072 B1 * | 8/2002 | Moore | 296/24.34 |
| 6,655,561 B2 * | 12/2003 | Panhelleux et al. | 224/275 |
| 6,719,343 B2 * | 4/2004 | Emerling et al. | 296/24.34 |
| 7,007,993 B2 * | 3/2006 | Kubota | 296/24.34 |

FOREIGN PATENT DOCUMENTS

JP A-10-203284 8/1998

\* cited by examiner

*Primary Examiner*—H Gutman
(74) *Attorney, Agent, or Firm*—Posz Law Group, PLC

(57) ABSTRACT

A console module is installed on the floor panel of a vehicle and includes a console main body, an electronic component, and an installation base. The installation base is located between the console main body and the floor panel. Both of the console main body and the electronic component are installed on the floor panel by means of the installation base. The installation base has first and second console brackets for securing the console main body to the floor panel, and a case for accommodating the electronic component. The installation base further includes a pair of rails that extend along the vehicle fore-and-aft direction between the case and the second console bracket.

15 Claims, 7 Drawing Sheets

INSTALLATION STRUCTURE FOR CONSOLE MODULE

BACKGROUND OF THE INVENTION

The present invention relates to an installation structure for a console module provided, for example, in an automobile.

For example, Japanese Laid-Open Patent Publication No. 10-203284 discloses a console module for a vehicle equipped with an airbag apparatus. In the structure of the publication, an airbag ECU (electronic control unit), which is an electronic component, is located under the console module having a shift lever and a console box. In this case, as shown in FIG. 12, a console module 180 includes a console main body 181, which is secured to a floor panel 182. The console main body 181 is fastened to the floor panel 182 with screws by means of console brackets 185a, 185b, which are formed to conform to the vehicle type. An airbag ECU (electronic control unit) 183 is accommodated in a case 184 in advance. The case 184 is fastened to the floor panel 182 with screws by means of a specially designed case bracket 186.

In recent years, there is a growing demand for cost reduction and quality improvement of products in assembly lines of automobiles. However, according to the above described configuration, workers at an automobile assembly line need to separately fasten the console brackets 185a, 185b, and the case bracket 186 with screws. This increases the number of the points to be fastened with screws, and thus complicates the installation of the console brackets 185a, 185b and the case bracket 186. As a result, the manufacturing cost is increased. The increased number of the points to be fastened causes the accuracy of the locations of the holes for screws and fastening torque to have a greater influence to the installation accuracy. In other words, it is difficult to maintain the installation accuracy of the console main body 181.

In addition to the drawbacks in the complicated installation work and the installation accuracy, the structure of the floor panel 182 has a drawback. That is, as shown in FIG. 12, a central portion of the floor panel 182 to which the console module 180 is assembled has a floor tunnel 182a. The floor tunnel 182a has an inverted U-shaped cross-section and extends along a fore-and-aft direction of the vehicle. In this case, a severe impact applied externally to the vehicle is likely to deform the floor panel 182 at the central portion, where the floor tunnel 182a is formed. Particularly, since an external impact can easily deform a center pillar by a great degree and thus move a seat on which an occupant is seated inward of the vehicle, the floor tunnel 182a is easily deformed. This drawback occurs substantially in the same manner for vehicles having no floor tunnel 182a. Therefore, there is a demand for increased rigidity of console modules.

SUMMARY OF THE INVENTION

Accordingly, it is an objective of the present invention to provide a console module that increases the installation accuracy and reduces the manufacturing cost. Another objective of the present invention is to provide a console module having an improved rigidity.

To achieve the foregoing and other objectives and in accordance with the purpose of the present invention, a console module installed on a floor panel of a vehicle is provided. The console module includes a console main body, an electronic component, and an installation base. The console main body is located on the floor panel between a driver's seat and a front passenger seat. The electronic component is located between the console main body and the floor panel. The installation base is located between the console main body and the floor panel. Both of the console main body and the electronic component are installed on the floor panel by means of the installation base.

The present invention also provides a console module installed on a floor panel of a vehicle, which console module includes a console main body, a console bracket and a reinforcing member. The console main body is located on the floor panel between a driver's seat and a front passenger seat. The console bracket secures the console main body to the floor panel. The reinforcing member reinforces the console main body. The reinforcing member is secured to the floor panel by means of the console bracket.

Further, the present invention provides a console module installed on a floor panel of a vehicle, which console module includes a console main body, a reinforcing member, and first and second console brackets. The console main body is located on the floor panel between a driver's seat and a front passenger seat. The reinforcing member reinforces the console main body. The first and second console brackets secure the console main body to the floor panel. Each console bracket extends along a lateral direction of the vehicle. A front end portion of the reinforcing member is held between the floor panel and a central portion of the first console bracket with respect to the vehicle lateral direction, and a rear end portion of the reinforcing member is held between the floor panel and a central portion of the second console bracket with respect to the vehicle lateral direction.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A first embodiment of the present invention will now be described with reference to FIGS. 1 to 5.

Figure 1:
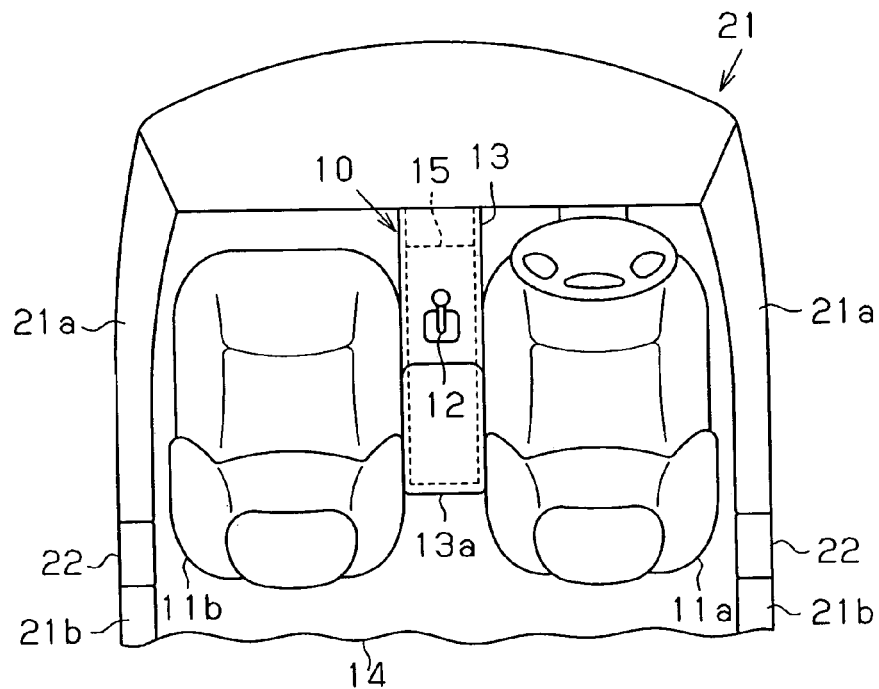
FIG. 1 is a plan view illustrating a passenger compartment of a vehicle in which a console module according to a first embodiment is installed.
Figure 2:
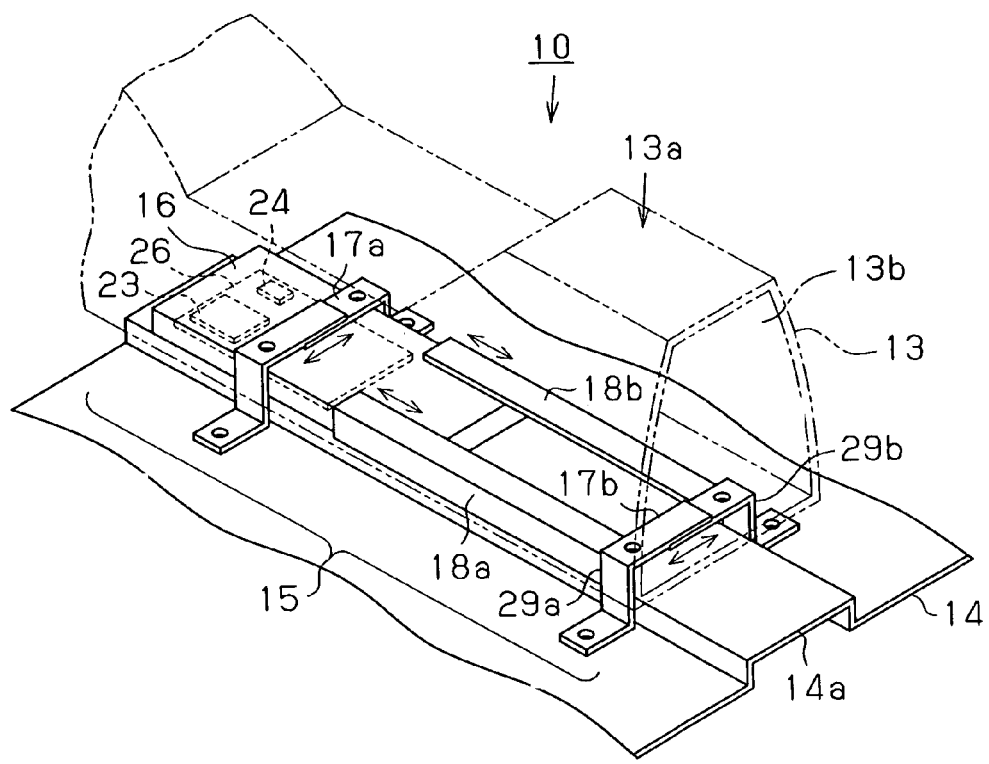
FIG. 2 is a perspective view illustrating an installation base for the console module according to the first embodiment.

As shown in FIGS. 1 and 2, a console module 10 is located between a driver's seat 11a and a front passenger seat 11b in a passenger compartment of a vehicle. The console module 10 includes a console main body 13 in which a shift lever 12 and a console box 13a are provided. The console main body 13 is made of a synthetic resin and has a square cross-section. Also, the console main body 13 extends in a fore-and-aft direction of the vehicle. A rear panel 13b is fitted in the rear portion of the console main body 13. The console main body 13 is located on the upper surface of a floor panel 14, which forms the floor of the passenger compartment.

The console module 10 includes an installation base 15, which is located between the console main body 13 and the floor panel 14. The installation base 15 functions to assemble the console main body 13 to the floor panel 14. The installation base 15 includes a case 16, first and second console brackets 17a, 17b, and left and right rails 18a, 18b. The first console bracket 17a is located in a front portion, and the second console bracket 17b is located in a rear portion. The console brackets 17a, 17b and the rails 18a, 18b are integrated to have a frame structure.

The case 16 is a relatively thin metal square case. The case 16 is located on the upper surface of the floor panel 14 with the longitudinal direction of the case 16 aligned with the fore-and-aft direction of the vehicle 21. Specifically, a floor tunnel 14a having a U-shaped cross-section is formed to protrude upward in the floor panel 14 at a location between the driver's seat 11a and the front passenger seat 11b, and the case 16 is located on the floor tunnel 14a. The console box 13a, which functions as a storage portion, is located in a rear portion of the console main body 13. The case 16 is located frontward of the front end of the console box 13a. The case 16 accommodates an electronic component, which is a printed board 26 on which an airbag ECU (electronic control unit) 23 and an impact sensor 24 are mounted. The airbag ECU 23 control an airbag apparatus of the vehicle 21.

Figure 3:
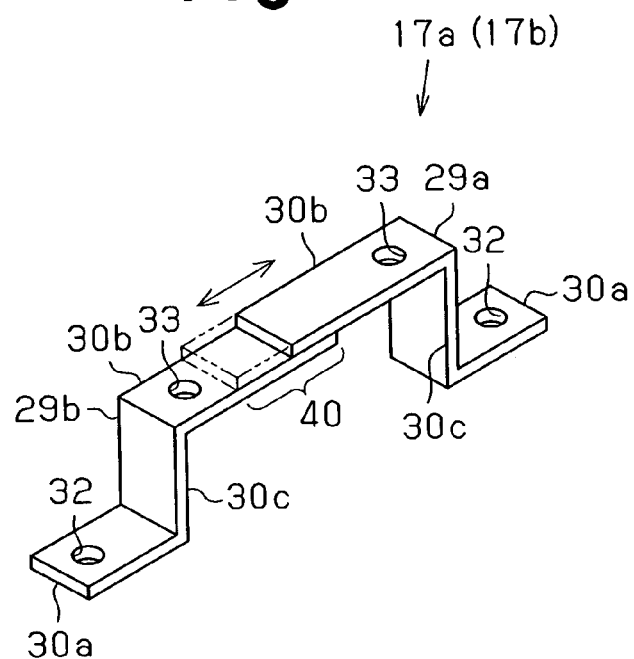
FIG. 3 is a perspective view illustrating a width adjuster mechanism of the installation base according to the first embodiment.
Figure 4:
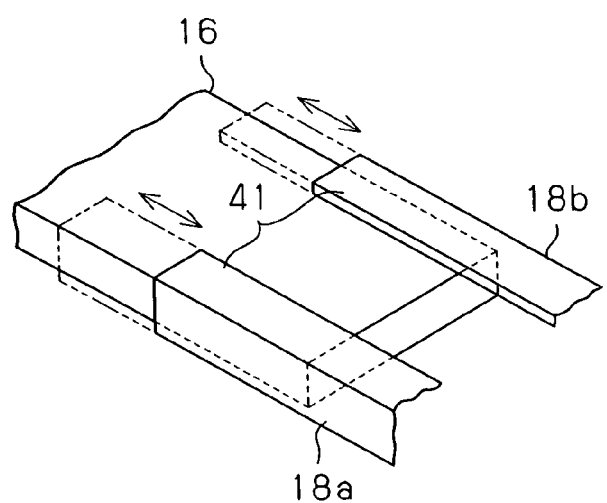
FIG. 4 is a perspective view illustrating a length adjuster mechanism of the installation base according to the first embodiment.

The first and second console brackets 17a, 17b are located in a front end portion and a rear end portion of the console main body 13, respectively. Also, the console brackets 17a, 17b extend along the lateral direction of the vehicle between left and right sides of the console main body 13. As shown in FIG. 3, each of the console brackets 17a, 17b is formed by combining first and second bracket pieces 29a, 29b, which are arranged left and right of each other. Each of the bracket pieces 29a, 29b is formed by pressing a rectangular metal plate into a predetermined shape. Each of the bracket pieces 29a, 29b has a first fixing portion 30a, a second fixing portion 30b, and a leg portion 30c. The first fixing portion 30a is fixed to the upper surface of the floor panel 14. The second fixing portion 30b contacts the upper surface of the case 16. The leg portion 30c extends vertically to connect the first fixing portion 30a and the second fixing portion 30b to each other. The first fixing portion 30a extends horizontally at one end of the bracket piece 29a, 29b. The second fixing portion 30b extends horizontally at the other end of the bracket piece 29a, 29b.

Figure 5:
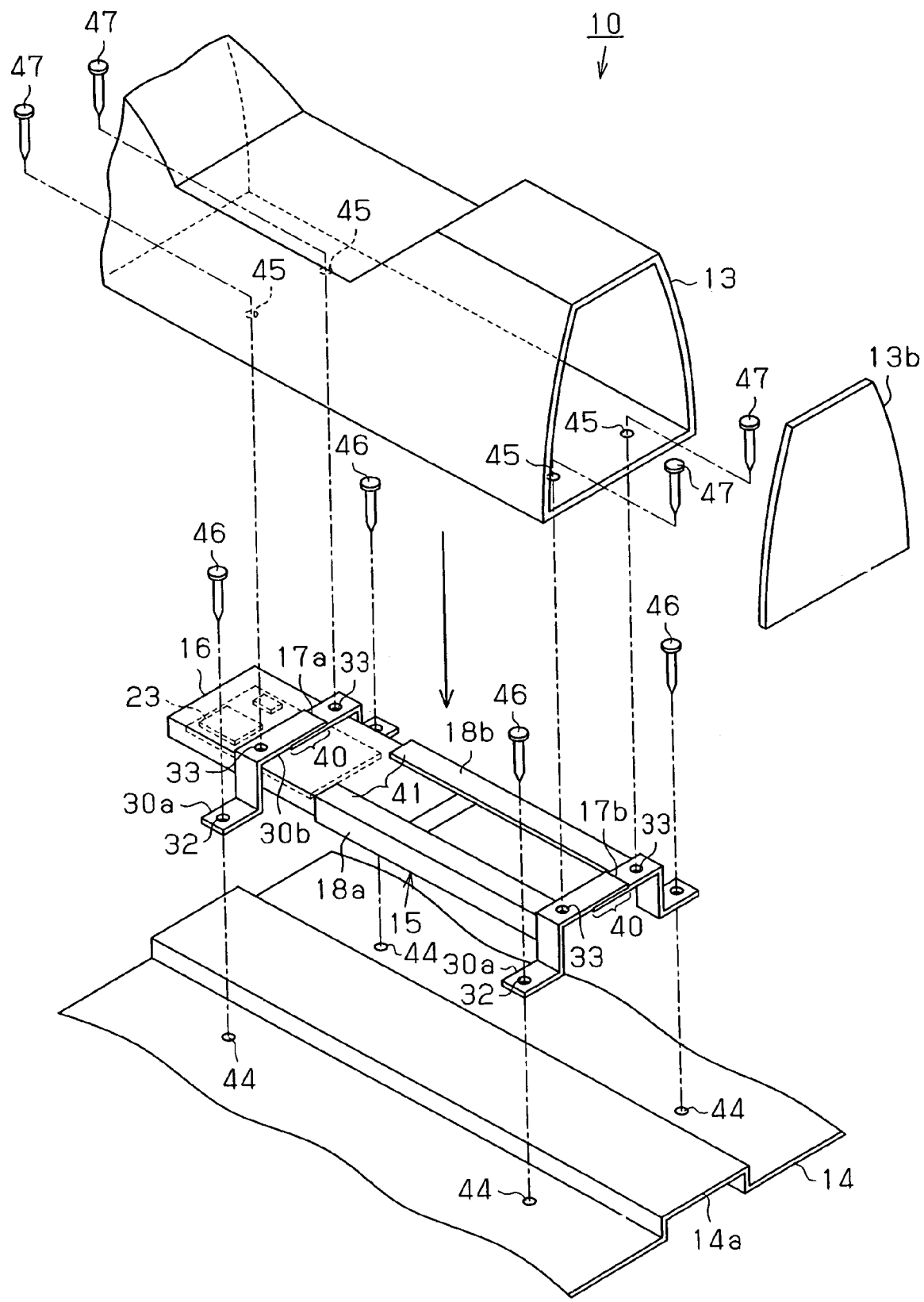
FIG. 5 is an exploded perspective view illustrating the console module according to the first embodiment.

As shown in FIGS. 3 and 5, a first fixing hole 32 is formed in a central portion of each first fixing portion 30a. The first fixing hole 32 is used to secure the bracket piece 29a, 29b to the floor panel 14. A second fixing hole 33 is formed in an end portion of each second fixing portion 30b that is close to the leg portion 30c. The second fixing holes 33 are used to fix the console main body 13 to the bracket pieces 29a, 29b.

Each of the console brackets 17a, 17b is formed by stacking the second fixing portion 30b of the first bracket piece 29a on the second fixing portion 30b of the second bracket piece 29b. The length of each console bracket 17a, 17b can be adjusted by changing the stacking amount of the bracket pieces 29a, 29b. This construction provides a width adjuster mechanism 40 to each of the console brackets 17a, 17b. The width adjuster mechanism 40 is used to adjust the distance between the first fixing hole 32 of the first bracket piece 29a and the first fixing hole 32 of the second bracket piece 29b, or the distance between the second fixing hole 33 of the first bracket piece 29a and the second fixing hole 33 of the second bracket piece 29b. That is, the width adjuster mechanism 40 permits the lateral measurement of the installation base 15 to be adjusted in accordance with the width of the console main body 13. The width adjuster mechanism 40 is preferably configured such that the first bracket piece 29a and the second bracket piece 29b are not easily displaced from each other. For example, the lower surface of the second fixing portion 30b of the first bracket piece 29a and the upper surface of the second fixing portion 30b of the second bracket piece 29b may be roughened or made to have recesses and projections.

The first and second console brackets 17a, 17b are fixed to the upper surface of the floor panel 14 at locations on the sides of the floor tunnel 14a with the central portions held above the floor tunnel 14a. The first console bracket 17a is located at the front end portion of the console main body 13. The first console bracket 17a holds the case 16 on the upper surface of the floor tunnel 14a. The second console bracket 17b is located at the rear end portion of the console main body 13.

The left and right rails 18a, 18b are fixed to left and right portions of the second console bracket 17b, respectively. The rails 18a, 18b have an L-shaped cross section and are made of metal. The rails 18a, 18b extend in the fore-and-aft direction and have an improved rigidity. The rear ends of the rails 18a, 18b are welded to the upper ends of the leg portions 30c and the proximal portions of the second fixing portions 30b of the bracket pieces 29a, 29b. The rails 18a, 18b extend horizontally in parallel. The positions of the front ends of the rails 18a, 18b can be adjusted along the fore-and-aft direction in relation to the rear end of the case 16. This construction provides a length adjuster mechanism 41 at the joint between the front ends of the rails 18a, 18b and the rear end of the case 16. In this embodiment, the front ends of the rails 18a, 18b are engaged with the upper surface and the side surfaces of the rear end of the case 16.

The length adjuster mechanism 41 permits the positions at which the front ends of the rails 18a, 18b and the rear end of the case 16 to be adjusted, thereby adjusting the distance between the first console bracket 17a and the second console bracket 17*b* along the fore-and-aft direction of the vehicle. That is, the length adjuster mechanism 41 permits the length of the installation base 15 along the fore-and-aft direction according to the length of the console main body 13 along the fore-and-aft direction. The length adjuster mechanism 41 is preferably configured such that the rails 18*a*, 18*b* and the case 16 are not easily displaced from each other. For example, the lower surface of the rails 18*a*, 18*b* and the upper surface of the rear end of the case 16 may be roughened or made to have recesses and projections The installing method of the console module 10 will now be described with reference to FIG. 5.

First, the position of the installation base 15 is determined on the floor panel 14 using the width adjuster mechanism 40 and the length adjuster mechanism 41 in accordance with the type of the vehicle in which the console main body 13 will be installed. Thereafter, fixing holes 44 are formed in the floor panel 14 in accordance with the position of the installation base 15. The positions of the fixing holes 44 are preferably determined in the design process according to the type of the vehicle.

Then, in the assembly line of the vehicle, the case 16, in which the electronic components such as the airbag ECU 23 are accommodated, and the console main body 13 are assembled to the floor panel 14 by means of the installation base 15. First, the installation base 15 is fixed to the floor panel 14 with screws. At this time, the installation base 15 is fixed above the floor tunnel 14*a* by fastening the first fixing portions 30*a* of the first and second console brackets 17*a*, 17*b* to the fixing holes 44 in the floor panel 14 with fixing screws 46. At this time, a central portion of the upper surface of the case 16 contacts the lower surface of the second fixing portion 30*b* of the second bracket piece 29*b*, which is a part of the first console bracket 17*a*. That is, the lower surface of the case 16 is placed on the floor tunnel 14*a*. Therefore, the case 16 is held between the second fixing portion 30*b* and the floor tunnel 14*a*.

Subsequently, the console main body 13 is secured to the installation base 15 with screws 47. At this time, the front portion of the console main body 13 is fastened to the second fixing portions 30*b* of the first console bracket 17*a* with the screws 47, and the rear portion is fastened to the second fixing portions 30*b* of the second console bracket 17*b* with the screws 47. Finally, the rear panel 13*b* is fitted in the rear end of the console main body 13 to complete the installation of the console module 10 to the floor panel 14.

The advantages of the first embodiment are as follows.

The console main body 13 is assembled to the floor panel 14 of the vehicle 21 by means of the installation base 15. Since the case 16, which accommodates electronic components such as the airbag ECU 23, is fixed to the installation base 15 in advance, there is no need for separately installing the electronic components to the vehicle 21. Accordingly, the installation procedure on the assembly line of the vehicle 21 is simplified, and the manufacturing cost is thus reduced.

The first and second console brackets 17*a*, 17*b* are located in a front end portion and a rear end portion of the console main body 13, respectively. Also, the console brackets 17*a*, 17*b* extend along the lateral direction of the vehicle between left and right sides of the console main body 13. Since the front and rear ends and the sides of the console main body 13 are fixed through the first and second console brackets 17*a*, 17*b*, the console main body 13 is stably fixed. Also, since the first console bracket 17*a* located at the front portion of the console main body 13 holds the case 16 with the upper surface of the floor panel 14, the case 16, which accommodates electronic components such as the airbag ECU 23, is stably installed.

Further, since the front and rear ends of the console main body 13 are easy to reach with hands and tools of a worker, the installation is facilitated.

The installation base 15 includes a case 16, first and second console brackets 17*a*, 17*b*, and left and right rails 18*a*, 18*b*. The first console bracket 17*a* is located in a front portion, and the second console bracket 17*b* is located in a rear portion. The console brackets 17*a*, 17*b* and the rails 18*a*, 18*b* are integrated to have a frame structure. Since the console main body 13 is installed by means of the installation base 15, and the first and second console brackets 17*a*, 17*b* are hardly displaced, the installing accuracy of the console main body 13 is improved. Also, since the installation base 15 hardly gets out of shape, rigidity is added to the resin console main body 13, which improves the mechanical strength of the console main body 13.

The installation base 15 has the width adjuster mechanism 40 and the length adjuster mechanism 41. The width adjuster mechanism 40 adjusts the length of the console brackets 17*a*, 17*b* along the lateral direction of the vehicle, and the length adjuster mechanism 41 adjusts the distance between the first and second console brackets 17*a*, 17*b* along the fore-and-aft direction of the vehicle. Using the adjuster mechanisms 40, 41, the position of the installation base 15 relative to the console main body 13 and the floor panel 14 in accordance with the type of the vehicle to which the console main body 13 is installed. Therefore, the installation base 15 can be used for various types of vehicles, which improves the versatility of the installation base 15.

The console box 13*a* is located in a rear portion of the console main body 13. The case 16 is located frontward of the front end of the console box 13*a*. Since the case 16 is displaced from the console box 13*a*, the case 16 does not reduce the volume of the accommodating space of the console box 13*a*.

The electronic components such as the airbag ECU 23 and the airbag impact sensor 24 are accommodated in the metal case 16. This structure prevents foreign matter such as dust from entering the electronic components. Also, the electronic components are prevented from being influenced by magnetism and static electricity, and from being damaged by vibration and impacts.

A second embodiment of the present invention will now be described with reference to FIGS. 6 and 7. Like or the same reference numerals are given to those components that are like or the same as the corresponding components of the first embodiment.

Figure 6:
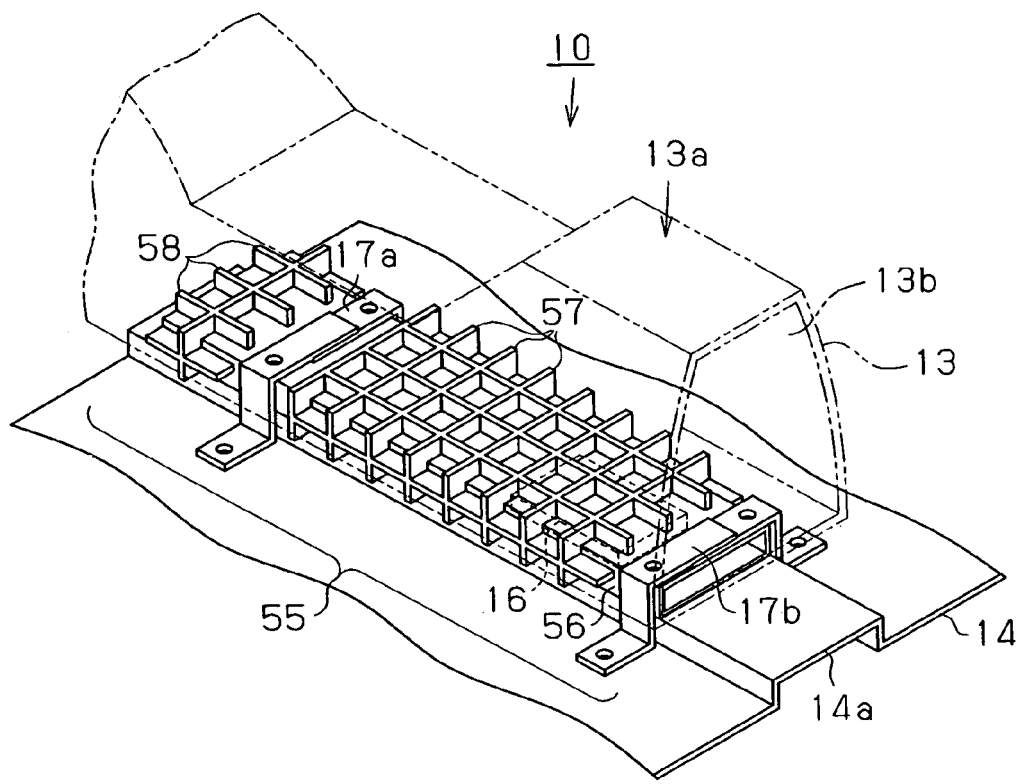
FIG. 6 is a perspective view illustrating an installation base for a console module according to a second embodiment.
Figure 7:
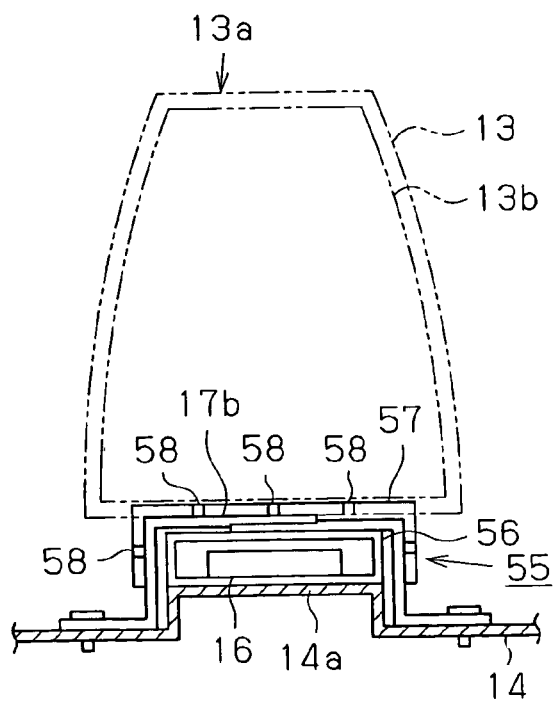
FIG. 7 is a cross-sectional view illustrating the installation base for a console module according to the second embodiment.

As shown in FIGS. 6 and 7, an installation base 55 includes a case 16, first and second console brackets 17*a*, 17*b*, and a reinforcing member 56. The first console bracket 17*a* is located in a front portion, and the second console bracket 17*b* is located in a rear portion. The reinforcing member 56 has a square cross-section. The installation base 55 is formed by integrating the case 16, the first and second console brackets 17*a*, 17*b*, and the reinforcing member 56.

The reinforcing member 56 is made of a metal having a high rigidity and extends along the fore-and-aft direction. The width of the reinforcing member 56 is substantially the same as the distance between the left and right sides of the console main body 13. The reinforcing member 56 reinforces the console main body 13 with respect to the lateral direction of the vehicle 21. The length of the reinforcing member 56 is substantially the same as the length of the console main body 13 along the fore-and-aft direction. The reinforcing member 56 thus reinforces the entire console main body 13. The reinforcing member 56 is arranged such that its longitudinal direction matches with the fore-and-aft direction of the vehicle 21 and is located on the upper surface of the floor panel 14 to which the console main body 13 is installed. The reinforcing member 56 accommodates in the interior the case 16, in which the electronic components such as the airbag ECU 23 and the airbag impact sensor 24 (see FIG. 2) are located. The case 16 is located in the vicinity of the rear end of the reinforcing member 56 and is fixed to the inner surface of the reinforcing member 56 by means of adhesive or screws.

The front and rear ends of the reinforcing member 56 are secured to the floor panel 14 by means of the first and second console brackets 17a, 17b. Specifically, the first console bracket 17a, which is located at the front end of the console main body 13, holds the front end portion of the reinforcing member 56 on the upper surface of the floor tunnel 14a. Likewise, the second console bracket 17b, which is located at the rear end of the console main body 13, holds the rear end portion of the reinforcing member 56 on the upper surface of the floor tunnel 14a. In this manner, the reinforcing member 56 is secured to the floor panel 14 by means of the first and second console brackets 17a, 17b with the lower surface of the reinforcing member 56 contacting the upper surface of the floor tunnel 14a.

On outer sides of the reinforcing member 56 (upper and side surfaces in this embodiment), lateral bracket ribs 57 are formed to extend in the lateral direction of the vehicle 21 and to reinforce the reinforcing member 56. The lateral bracket ribs 57 are arranged to be parallel to each other from the front end to the rear end of the reinforcing member 56. On the upper surface and the side surfaces of the reinforcing member 56, longitudinal bracket ribs 58 are formed to further reinforce the reinforcing member 56. The longitudinal bracket ribs 58 are substantially perpendicular to the lateral bracket ribs 57. The longitudinal bracket ribs 58 are arranged to be extend between the front end and the rear end of the reinforcing member 56 along the fore-and-aft direction of the vehicle 21.

The advantages of the second embodiment are as follows.

The installation base 55 includes the reinforcing member 56 having a high rigidity. The console main body 13 is secured to the floor panel 14 by means of the installation base 55 with the front and rear ends of the reinforcing member 56 held between the floor panel 14 and the central portions of the first and second console brackets 17a, 17b. The reinforcing member 56 thus secured to the floor panel 14 increases the rigidity of the floor panel 14. Therefore, when a severe external impact is applied to the vehicle 21, deformation of the part of the floor panel 14 between the driver's seat 11a and the front passenger seat 11b is suppressed. Accordingly, the rigidity of the entire console module 10 is increased.

Particularly, when an external severe impact greatly deforms the center pillar 22 of the vehicle, which center pillar 22 has less rigidity than the front door 21a and the rear door 21b, the driver's seat 11a or the front passenger seat 11b is prevented from being inwardly displaced by the deformation of the center pillar 22.

The installation base 55 is formed by integrating the case 16, the first and second console brackets 17a, 17b, and the reinforcing member 56. Using the installation base 55 permits the case 16, which accommodates electronic components such as the airbag ECU 23, and the reinforcing member 56 to be secured to the floor panel 14 that same time the console main body 13 is secured to the floor panel 14.

Thus, compared to a case where the console main body 13, the case 16, and the reinforcing member 56 separately secured to the floor panel 14, the number of sections that are fastened with screws is decreased. This simplifies the installation. Accordingly, the installation procedure on the assembly line of the vehicle 21 is simplified.

On the outer surface of the reinforcing member 56, the lateral bracket ribs 57, which extend in the lateral direction of the vehicle 21, and the longitudinal bracket ribs 58, which extend in the fore-and-aft direction of the vehicle 21, are formed. This further increases the rigidity of the installation base 55, to which the reinforcing member 56 is attached. Attaching the installation base 55 to the floor panel 14 therefore further increases the rigidity of the floor panel 14. Therefore, when a severe external impact is applied to the vehicle 21, deformation of the part of the floor panel 14 between the driver's seat 11a and the front passenger seat 11b is more effectively suppressed. Accordingly, the rigidity of the entire console module 10 is easily increased.

The case 16 is attached to the inner surface of the reinforcing member 56. The electronic components such as the airbag ECU 23 and the airbag impact sensor 24 are accommodated in the metal case 16 and, at the same time, located in the space inside the reinforcing member 56. This structure prevents foreign matter such as dust from entering the electronic components. Also, the electronic components are effectively prevented from being influenced by magnetism and static electricity, and from being damaged by vibration and impacts.

The present embodiment may be modified as described below.

The rails 18a, 18b may be omitted. In this case, the case 16 is fixed by the first console bracket 17a.

The installation base 15 may be configured such that the rails 18a, 18b are fixed to the left and right sides of the case 16, the first console bracket 17a is fixed to the front ends of the rails 18a, 18b, and the second console bracket 17b is fixed to the rear ends of the rails 18a, 18b. In this case, the case 16 maybe located between the first console bracket 17a and the floor tunnel 14a. Alternatively, the case 16 may be located between the rails 18a, 18b and the floor tunnel 14a.

Contacting surfaces of each pair of the first and second bracket pieces 29a, 29b of the console brackets 17a, 17b, or the lower surface of the second fixing portion 30b of the first bracket piece 29a and the upper surface of the second fixing portion 30b of the second bracket piece 29b, may be provided with stoppers. Also, the contacting surfaces of the rear end of the case 16 and the front surface of the rails 18a, 18b, or the upper surface of the rear end of the case 16 and the lower surfaces of the front ends of the rails 18a, 18b may be equipped with stoppers.

The installation base 15 may configured such that the bracket pieces 29a, 29b are integrated and the width adjuster mechanism 40 is omitted. Alternatively, the installation base 15 may be configured such that the rails 18a, 18b and the rear end of the case 16 are integrated and the length adjuster mechanism 41 is omitted. Further, both of the width adjuster mechanism 40 and the length adjuster mechanism 41 may be omitted from the installation base 15.

The case 16 may be located in a central portion or a rear portion of the console main body 13.

The installation base 15 may be used for securing the console main body 13 to a floor panel 14 that has no floor tunnel 14a.

The printed board 26 may mount electronic components other than the airbag ECU 23. The printed board 26 may mount, for example, a smart ECU.

Figure 8:
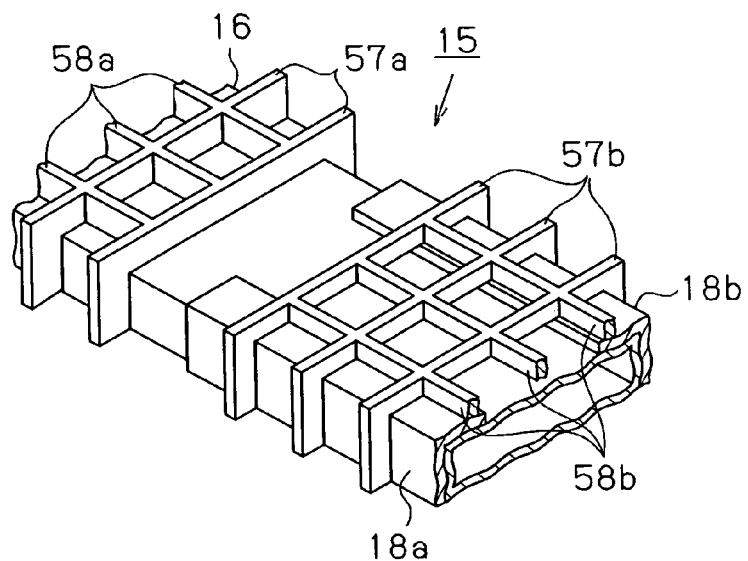
FIG. 8 is a perspective view illustrating an installation base for a console module according to a modified embodiment.

As shown in FIG. 8, the case 16 of the installation base 15 according to the first embodiment may have on the outer surface (the upper and side surfaces) lateral case ribs 57a and longitudinal case ribs 58a. In this case, the lateral case ribs 57a and the longitudinal case ribs 58a have the same structures as those of the lateral bracket ribs 57 and the longitudinal bracket ribs 58 according to the second embodiment. Accordingly, the rigidity of the console module 10 is further improved.

The rails 18a, 18b of the installation base 15 may have on the outer surface (the upper and side surfaces) lateral rail ribs 57b and longitudinal rail ribs 58b. In this case, the lateral rail ribs 57b and the longitudinal rail ribs 58b have the same structures as those of the lateral bracket ribs 57 and the longitudinal bracket ribs 58 according to the second embodiment. Accordingly, the rigidity of the console module 10 is further improved.

Figure 9:
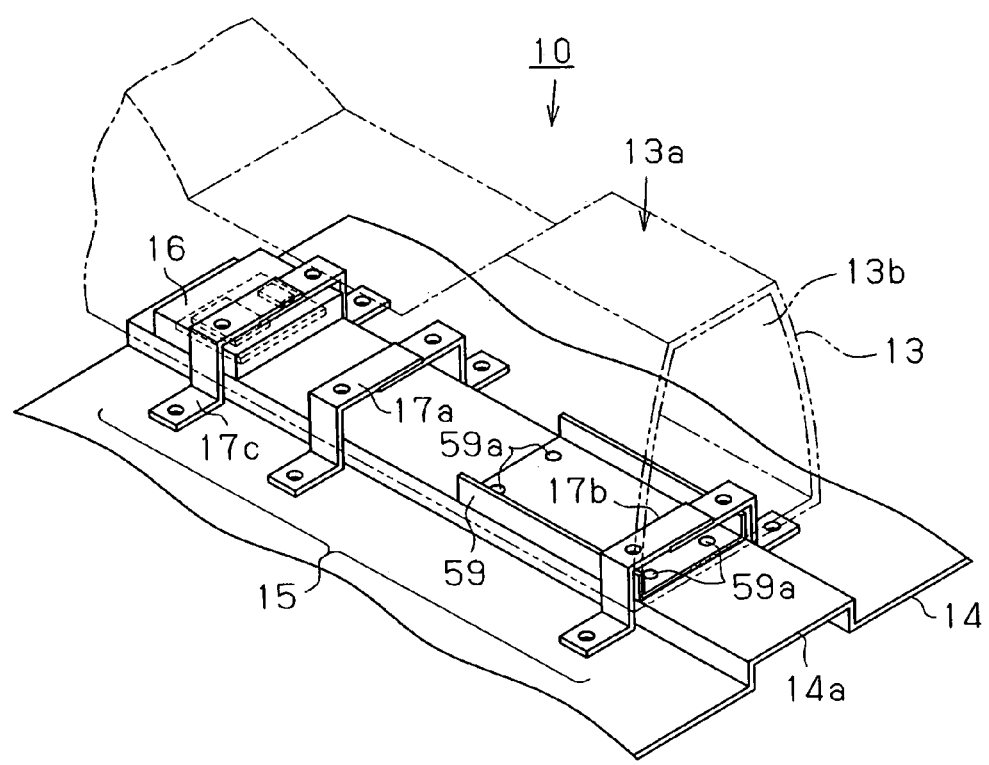
FIG. 9 is a perspective view illustrating an installation base for a console module according to a modified embodiment.

As shown in FIG. 9, the case 16, the first and second console brackets 17a, 17b, and a reinforcing member 59 may be secured to the floor panel 14 separately. In this case, the case 16 is secured to the floor panel 14 by means of a specially designed bracket 17c, and the console main body 13 is secured to the floor panel 14 by means of the first and second console brackets 17a, 17b. The reinforcing member 59 may be secured to the upper surface of the floor tunnel 14a by fixing front and rear portions by means of fixing screws 59a. The reinforcing member 59 has a U-shaped cross-section in FIG. 9. However, the reinforcing member 59 may have an H-shaped cross-section or may be a flat plate. The case 16, which is located in the vicinity of the front end of the console main body 13, may be located in a central portion or a rear portion of the console main body 13.

In the installation base 55 according to the second embodiment, the case 16 for accommodating electronic components such as the airbag ECU 23 may be omitted. The case 16 for accommodating electronic components such as the airbag ECU 23 may be located in any of a front portion, a central portion, and a rear portion of the console main body 13.

Either or both of the lateral bracket ribs 57 and the longitudinal bracket ribs 58 may be omitted.

Either or both of the lateral bracket ribs 57 and the longitudinal bracket ribs 58 may be provided on the inner surfaces of the reinforcing member 56. Either or both of the lateral bracket ribs 57 and the longitudinal bracket ribs 58 may be provided on the lower surfaces of the reinforcing member 56.

The reinforcing member 56 of the installation base 55 may have a U-shaped or H-shaped cross section. Alternatively, the reinforcing member 56 may be shaped as a flat plate. The case 16, which is located in the vicinity of the rear end of the reinforcing member 56, may be located in the vicinity of a central portion or a front portion of the reinforcing member 56.

Figure 10:
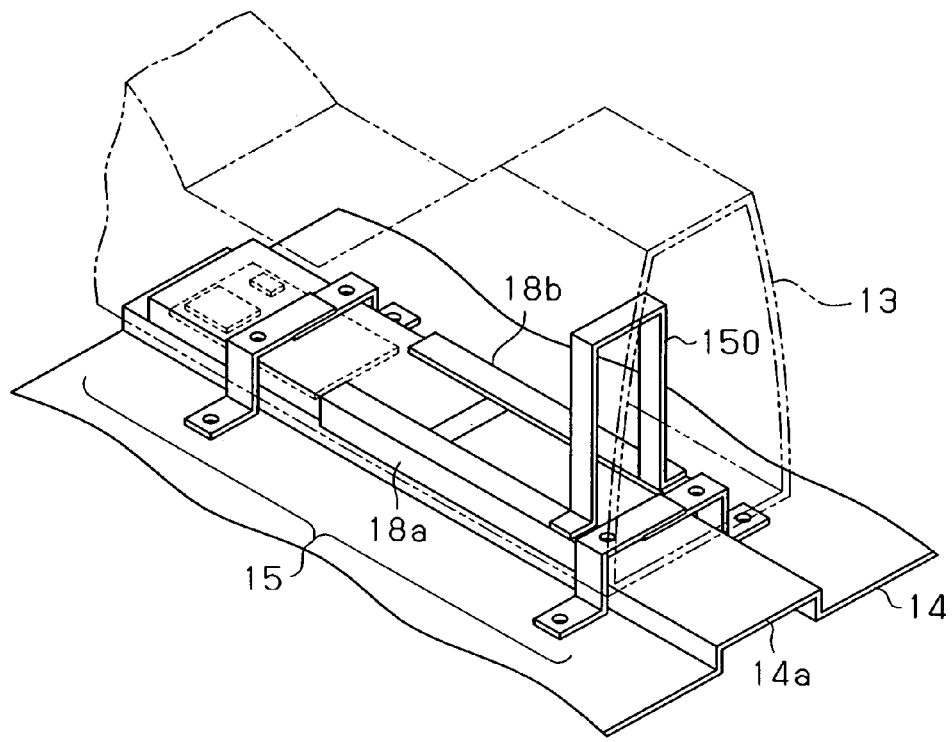
FIG. 10 is a perspective view illustrating an installation base for a console module according to a modified embodiment.

As shown in FIG. 10, the installation base 15 may be configured such that a U-shaped metal guide member 150 is attached to the rear ends of the rails 18a, 18b. For example, when a console main body 13 that is relatively tall is installed, for example, in a recreational vehicle or a minivan, the installation base 15 with the guide member 150 effectively increases the mechanical strength of the console main body 13.

Figure 11:
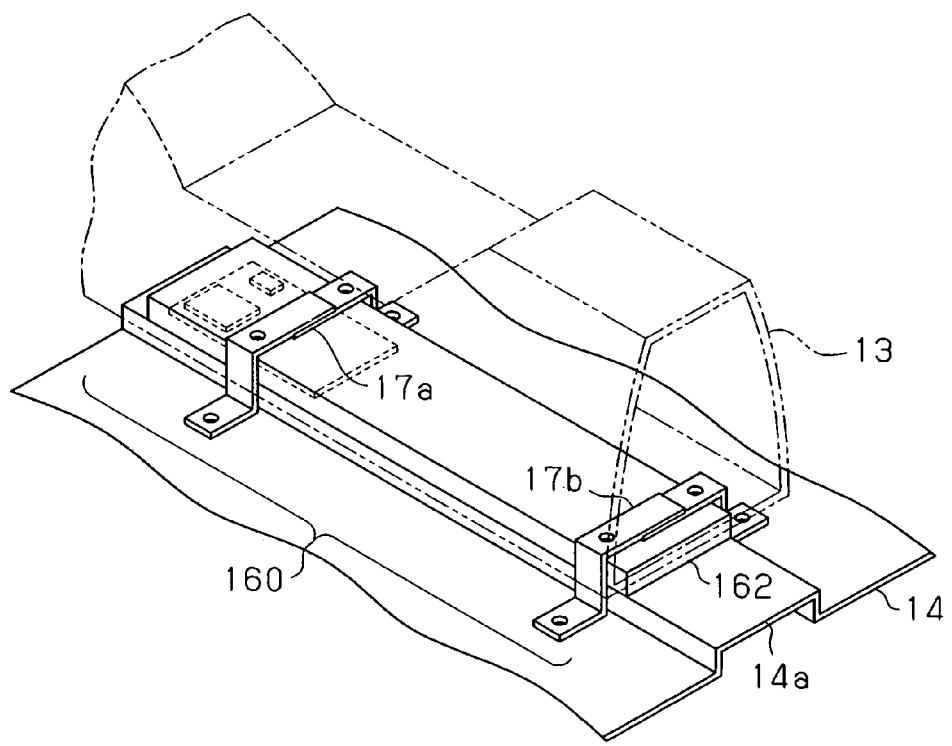
FIG. 11 is a perspective view illustrating an installation base for a console module according to a modified embodiment.
Figure 12:
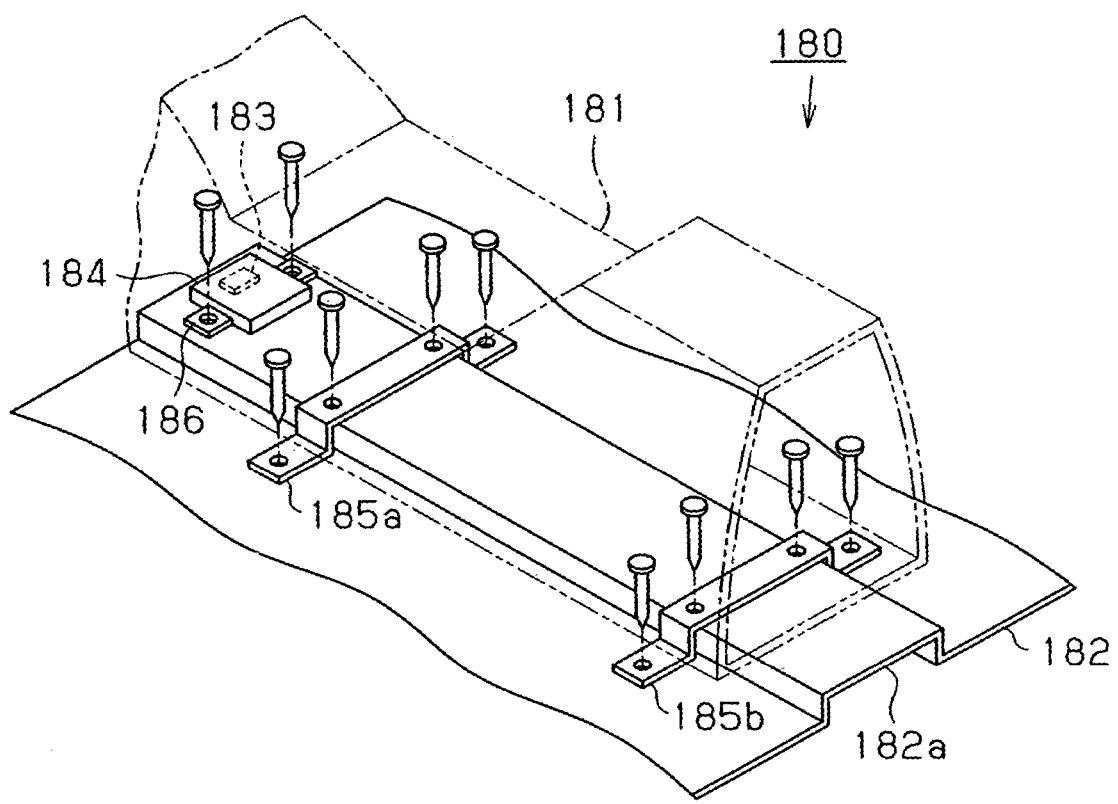
FIG. 12 is a perspective view illustrating a prior art installation structure for a console module.

As in an installation base 160 shown in FIG. 11, the rails 18a, 18b may be omitted. The installation base 160 has a case 162 that is held between the first console bracket 17a and the floor tunnel 14a. The rear end of the case 162 is held between the second console bracket 17b and the floor tunnel 14a. In this case, lateral case ribs 57a may be formed on the upper surface and the side surfaces of the case 162 along the lateral direction of the vehicle. Further, longitudinal case ribs 58a may be formed along the fore-and-aft direction of the vehicle. Accordingly, the rigidity of the installation base 160 against external impacts to the vehicle 21 is further improved.

The rails 18a, 18b may be provided between the first and second console brackets 17a, 17b, and a case may be held between a longitudinal center portion of the rails 18a, 18b and the floor panel 14.

Therefore, the present examples and embodiments are to be considered as illustrative and not restrictive and the invention is not to be limited to the details given herein, but may be modified within the scope and equivalence of the appended claims.

The invention claimed is:

1. A console module installed on a floor panel of a vehicle, comprising:
   a console main body located on the floor panel between a driver's seat and a front passenger seat;
   an electronic component located between the console main body and the floor panel; and
   an installation base located between the console main body and the floor panel, wherein both of the console main body and the electronic component are installed on the floor panel by means of the installation base, wherein the installation base includes:
   a console bracket for securing the console main body to the floor panel, the console bracket extending in a lateral direction of the vehicle; and
   a case for accommodating the electronic component, wherein the case is held between the floor panel and a central portion of the console bracket with respect to the lateral direction of the vehicle.

2. The console module according to claim 1, wherein the console bracket is configured such that its length along the vehicle lateral direction is adjustable.

3. The console module according to claim 2, wherein the console bracket includes a pair of bracket pieces, and the length of the console bracket along the vehicle lateral direction is adjusted by changing a stacking amount of the bracket pieces.

4. The console module according to claim 1, wherein the console bracket is a first console bracket, and wherein, in order to secure the console main body to the floor panel, the installation base further includes a second console bracket located rearward of the first console bracket with respect to a fore-and-aft direction of the vehicle, the second console bracket extending along the vehicle lateral direction.

5. The console module according to claim 4, wherein the first console bracket is located at a front end portion of the console main body, and the second console bracket is located at a rear end portion of the console main body.

6. The console module according to claim 4, wherein the installation base further includes a rail that extends along the vehicle fore-and-aft direction between the case and the second console bracket.

7. The console module according to claim 6, wherein a stacking amount of the rail and the case with respect to the vehicle fore-and-aft direction is adjustable.

8. The console module according to claim 6, wherein the rail has a reinforcing rib that extends along the vehicle lateral direction.

9. The console module according to claim 1, wherein the case has a reinforcing rib that extends along the vehicle lateral direction.

10. The console module according to claim 1, wherein the installation base includes
a reinforcing member for reinforcing the console main body, wherein the case is attached to the reinforcing member, and wherein the reinforcing member is secured to the floor panel by means of the console bracket.

11. The console module according to claim 10, wherein the console bracket is one of a first console bracket and a second console bracket, and wherein a front end portion of the reinforcing member is held between the floor panel and a central portion of the first console bracket with respect to a lateral direction of the vehicle, and a rear end portion of the reinforcing member is held between the floor panel and a central portion of the second console bracket with respect to the vehicle lateral direction.

12. The console module according to claim 10, wherein the reinforcing member has a reinforcing rib that extends along a lateral direction of the vehicle.

13. The console module according to claim 12, wherein the reinforcing member has a reinforcing rib that extends along a fore-and-aft direction of the vehicle.

14. The console module according to claim 1, wherein the installation base includes an adjuster mechanism for adjusting a dimension of the installation base along a lateral direction of the vehicle.

15. The console module according to claim 1, wherein the installation base includes an adjuster mechanism for adjusting a dimension of the installation base along a fore-and-aft direction of the vehicle.

* * * * *